No. 4,415. REISSUED JUNE 6, 1871.

C. D. RUTHERFORD.

CORSET.

2 SHEETS—SHEET 1.

Witnesses.

Thos. H. Dodge

S. A. Hanny

Inventor.

Clementine C. Rutherford

No. 4,415. REISSUED JUNE 6, 1871.

C. D. RUTHERFORD.

CORSET.

2 SHEETS—SHEET 2.

Witnesses.

Thos. H. Dodge

J. H. Adams

Inventor.

Clementina C. Rutherford

UNITED STATES PATENT OFFICE.

CLEMENTINE D. RUTHERFORD, OF BROOKLYN, NEW YORK, ASSIGNOR TO DAVID H. FANNING, OF WORCESTER, MASSACHUSETTS.

IMPROVEMENT IN CORSETS.

Specification forming part of Letters Patent No. 60,428, dated December 11, 1866; reissue No. 4,415, dated June 6, 1871.

*To all whom it may concern:*

Be it known that I, CLEMENTINE D. RUTHERFORD, of the city of Brooklyn, in the county of Kings and State of New York, have invented a new and useful Improvement in Corsets; and I do hereby declare that the following is a full, clear, and exact description thereof, reference being had to the accompanying drawing forming a part of this specification, in which—

Figure 1:
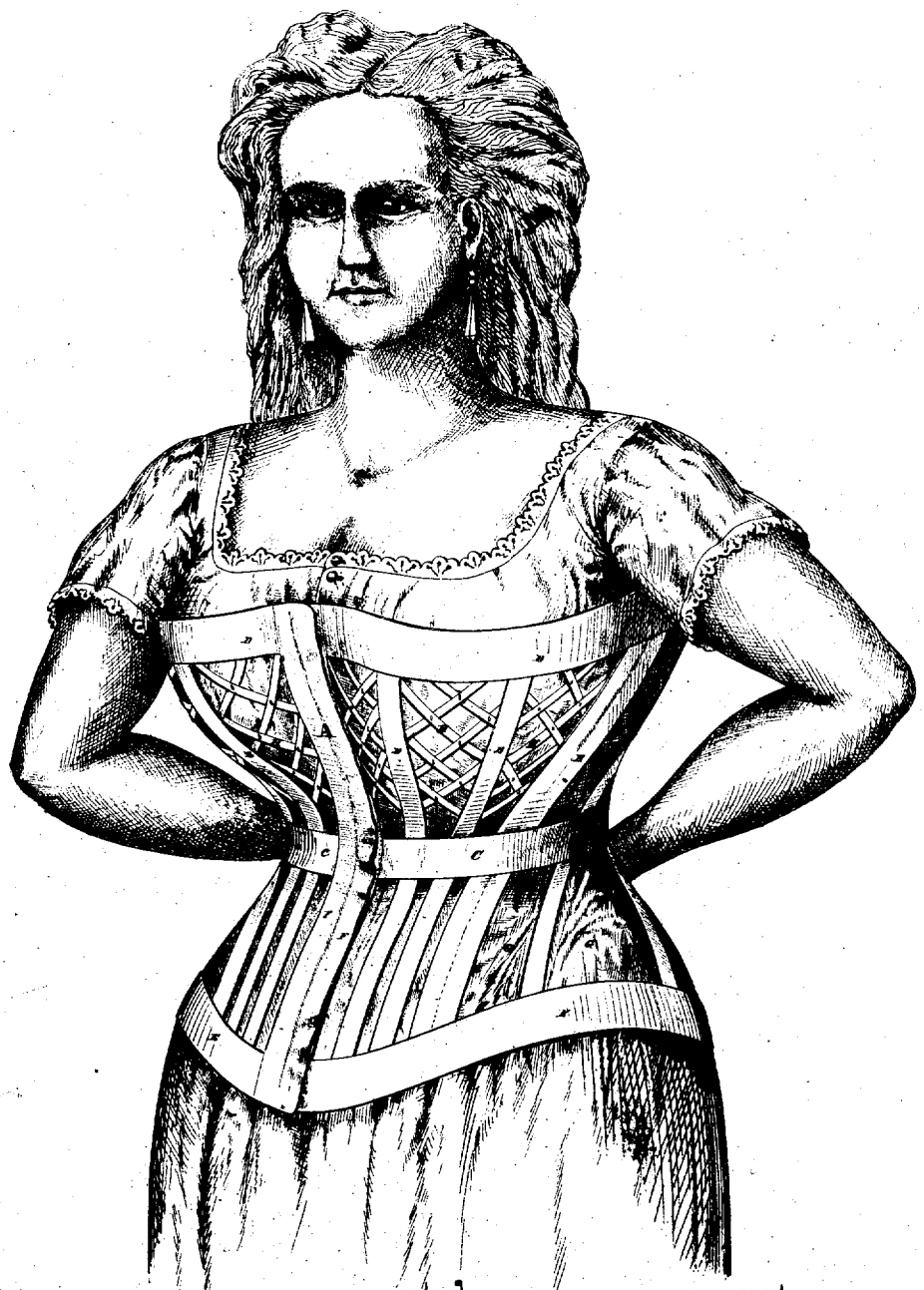
Figure 2:
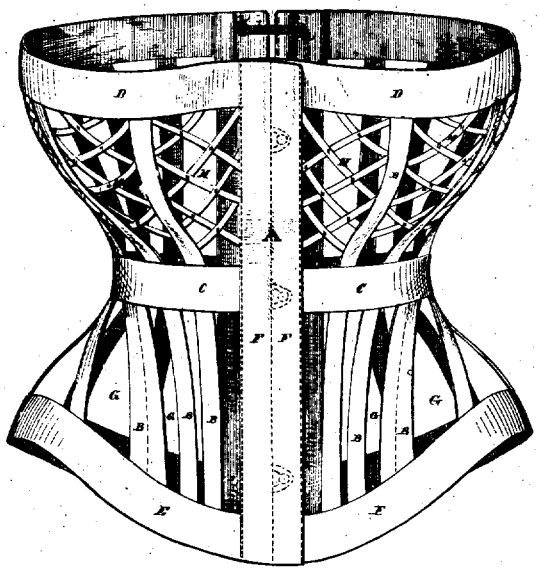
Figure 3:
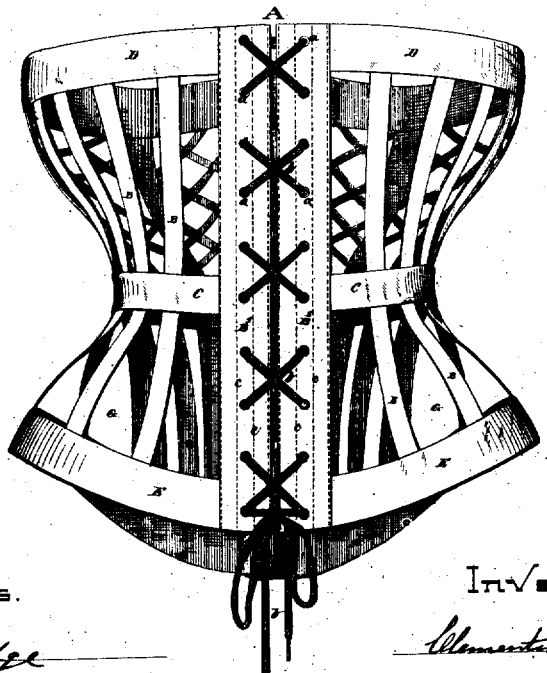

Figure 1, Plate I, represents a perspective view of my improved corset when clasped or fastened about the person for use; Fig. 2, Plate II, represents a front view of the corset; and Fig. 3, Plate II, represents a back view of the same.

To enable those skilled in the art to which my invention belongs to make and use my said improved corset, I will proceed to describe the same more in detail.

The object of the present invention is to so construct and form the corset that while sufficient support is imparted by it to the waist and form of the person by whom it is worn, yet it will be comfortable and cool to the wearer, it being especially adapted for use during the summer or warm season or portion of the year; and for this purpose the corset is made of skeleton form, or open between the cases which receive and support the whalebones—that is, the whalebone-cases project separately both above and below the central cross-band. The nature of my invention consists, first, in a skeleton corset, the two parts or halves of which are constructed of cased vertically-arranged ribs, stiffeners, or braces, the cases of which are connected together at top, middle, and bottom by tapes or flexible cloth-band sections to sustain them in corset form. Second, in a skeleton corset, the vertically-arranged stiffeners, of which are sustained in position by upper, central, and lower band-sections, the said stiffeners connected at the breast portions of the corset by a material so constructed that it shall be sufficiently open to admit of ventilation and at the same time have sufficient body to support the breasts. Third, in a skeleton corset, the vertically-arranged incased stiffeners of which are connected by an open net-work to support the person and permit ventilation.

In the drawing the corset is marked A. It is made in two sections or halves, the same being laced in the back and clasped in front, the size of which is to depend upon the person who is to wear it, it being made of suitable shape to conform to and nicely fit the waist and form of the person. The corset A is made or composed of a series of cases, B, made of cloth or other suitable material, to receive and support the whalebones, which are to be inserted and properly secured therein. The cases B of each half of the corset are placed or arranged at suitable distances apart, and are attached at a point about half-way from their ends to a section of a central cross-band, while the ends of said whalebone cases are secured to top and bottom bands or tapes. The central band-sections are marked C C, and the top and bottom sections D D and E E. The back ends of the central bands and the top and bottom bands or tapes are secured to cases B′ B′, in which is inserted a series of eyelets, *a a*, for the reception of the adjusting and lacing-cord *b*. The cases B′ B′ are provided with a whalebone at each side of the eyelets, the cases being stitched longitudinally, as indicated at *c c*. The front ends of the band-sections B, C, and D are secured to the front cases F F, in which are arranged steel springs provided with clasps for joining or connecting the front ends of the corset together when applied to the person in dressing. It will be observed that, as the ends of the cases in which the whalebones are placed project separately both above and below the central band, open spaces G will be left between the edges of the upwardly and downwardly projecting whalebone cases, and, consequently, when the outer garments are put on and properly fastened about the person, a circulation of air between the edges of the whalebone cases is not prevented. The upper front part of the corset, or that incasing or covering the breast, is formed of materials differing in construction, that of which the whalebone cases are made being of a close and firm material, to give the necessary and desired strength to the corset, while that which is interposed between the cases is of a more open fabrication, and made, in this instance, of a series of narrow tapes or bands, H H, fastened or secured to the whalebone cases, and to each other at their point of intersection or where they cross each other, forming an open net-work, the object of which is to cause the corset-frame to more fully support and sustain the breasts of the wearer, while at the same time it is sufficiently open to be comfortable and cool to the person.

It will be apparent to those skilled in the art to which my invention belongs that the motions of the body are comparatively free while my corset is being worn, since the separately-projecting ends of the whalebone cases are secured to cloth bands or tapes at both top and bottom.

From the above it is plainly obvious that my corset is exceedingly comfortable and cool to the wearer in the warm or summer season, while at the same time all the support necessary or desirable is secured to the form or waist, an advantage of the utmost importance. Then, again, in addition to the advantages above stated, my corset is equally as convenient as any other corset ever made in its case of adjustment and attachment to the person by means of the adjusting back-lacing and front steel clasps.

Having described my improved corset, what I claim therein as new and of my invention, and desire to have secured by Letters Patent, is—

1. A skeleton corset, the two parts or halves of which are constructed of cased vertically-arranged ribs, stiffeners, or braces, the cases of which are connected together at top, middle, and bottom by tapes or flexible cloth-band sections to sustain them in the corset form.

2. A skeleton corset, the vertically-arranged stiffeners of which are sustained in position by upper, central, and lower band-sections, the said stiffeners being connected at the breast portions of the corset by a material so constructed that it shall be sufficiently open to admit of ventilation and at the same time have sufficient body to support the breasts.

3. A skeleton corset, the vertically-arranged incased stiffeners of which are connected by an open net-work to support the person and permit ventilation.

CLEMENTINE D. RUTHERFORD.

Witnesses:

THOS. H. DODGE,

J. H. HAVENS.